(No Model.) 3 Sheets—Sheet 1.
G. M. CARTER & J. H. & C. L. DREW.
PUMPING POWER.

No. 571,611. Patented Nov. 17, 1896.

WITNESSES:

INVENTORS

ATTORNEYS.

(No Model.) 3 Sheets—Sheet 2.

G. M. CARTER & J. H. & C. L. DREW.
PUMPING POWER.

No. 571,611. Patented Nov. 17, 1896.

WITNESSES:
Henry T. Hirsch.
C. R. Ingason

INVENTORS:
G. M. Carter.
J. H. Drew.
C. L. Drew.
BY
Munn & Co.
ATTORNEYS.

THE NORRIS PETERS CO., PHOTO-LITHO., WASHINGTON, D. C.

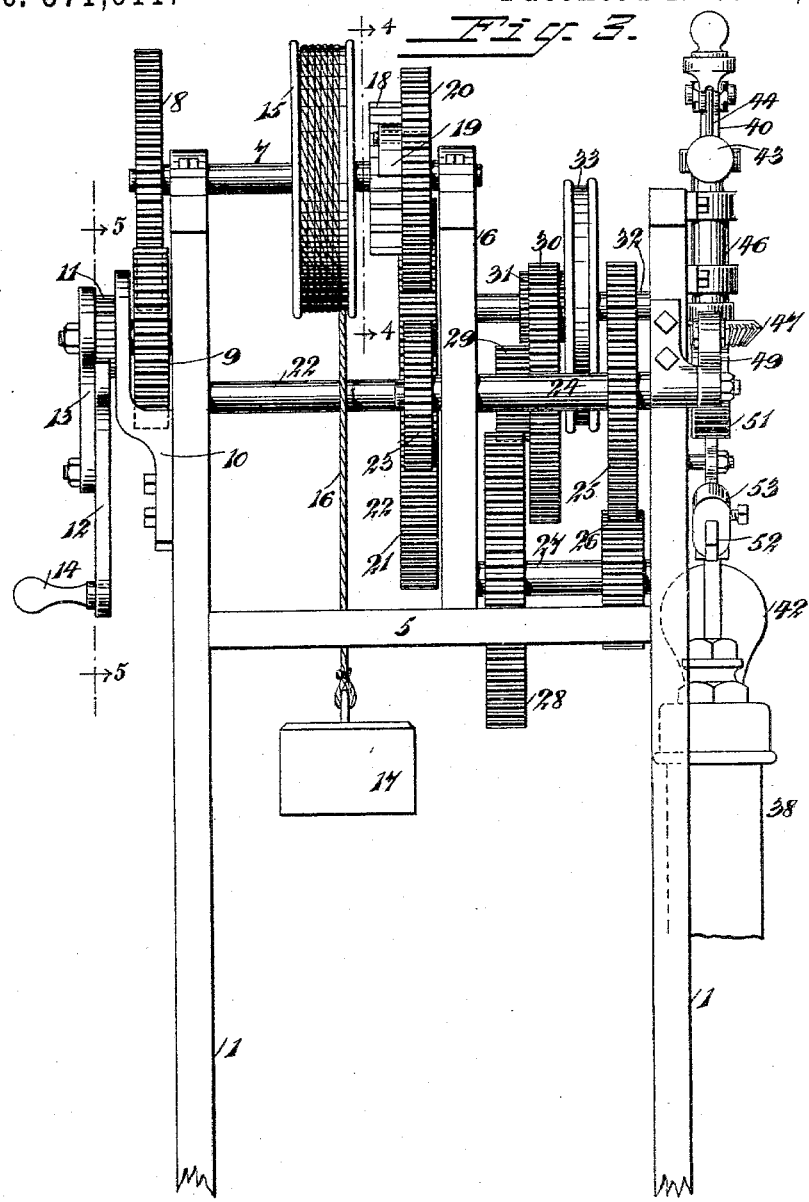

UNITED STATES PATENT OFFICE.

GEORGE M. CARTER, JOHN H. DREW, AND CHARLES L. DREW, OF EAST PRAIRIE, MISSOURI.

PUMPING-POWER.

SPECIFICATION forming part of Letters Patent No. 571,611, dated November 17, 1896.

Application filed March 20, 1896. Serial No. 584,116. (No model.)

*To all whom it may concern:*

Be it known that we, GEORGE M. CARTER, JOHN H. DREW, and CHARLES L. DREW, of East Prairie, in the county of Mississippi and State of Missouri, have invented a new and Improved Pumping-Power, of which the following is a full, clear, and exact description.

This invention relates to power devices for operating water or similar pumps; and the object is to provide a machine by which a considerable amount of power may be obtained and in which a regular rate of speed may be secured.

The invention consists in the construction and arrangement of parts, which will be hereinafter specified, and particularly pointed out in the appended claims.

Reference is to be had to the accompanying drawings, forming a part of this specification, in which similar characters of reference indicate corresponding parts in all the figures.

Figures 1, 4:
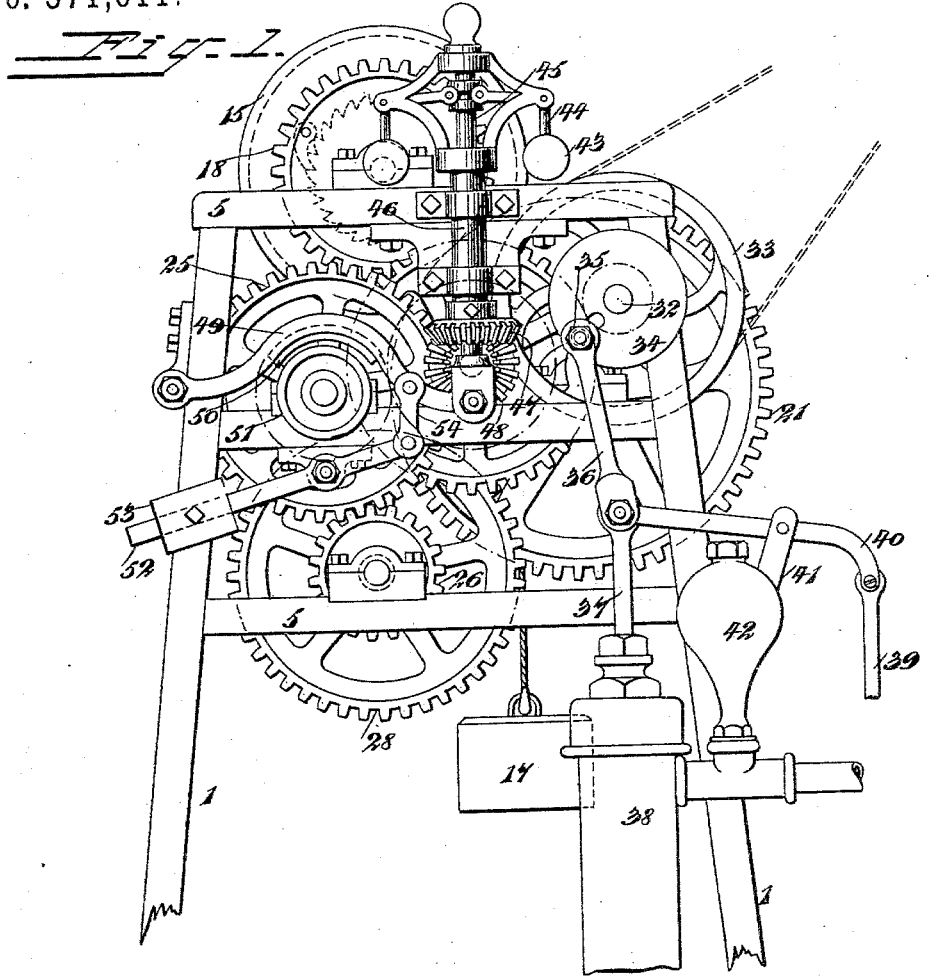
Figure 2:
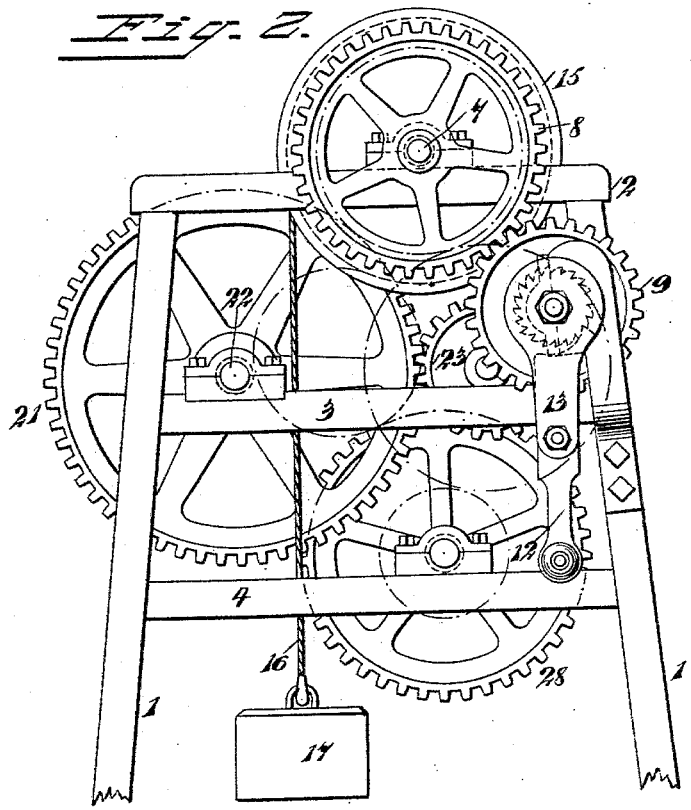
Figure 5:
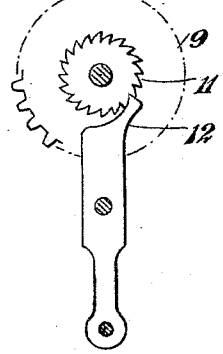

Figure 1 is an end elevation of a pumping-power machine embodying our invention. Fig. 2 is an elevation of the opposite end of the machine. Fig. 3 is a front elevation. Fig. 4 is a section on the line 4 4 of Fig. 3, and Fig. 5 is a section on the line 5 5 of Fig. 3.

The machine comprises a frame having end uprights 1, connected by cross-pieces 2 3 4, and the two end portions are connected by horizontal bars 5, and intermediate of the end portions and supported by the cross-bars 5 is a frame portion 6. Mounted on one of the end frames and the central portion 6 is a driving-shaft 7, having at its outer end a gear-wheel 8, meshing with a pinion 9, having journaled bearings in the end frame 1 and in a bracket 10, secured thereto, and on the outer end of this pinion is secured a ratchet-wheel 11, adapted to be engaged by a dog 12, pivoted to an arm 13, having a loose connection with the journal of the said pinion 9. This dog 12 is provided with a crank-handle 14, and by engaging the dog with the ratchet-wheel 11 it is obvious that the shaft 7 may be rotated to rotate the winding-drum 15, mounted on said shaft, and which has secured to it a rope 16, provided with an operating-weight 17 at its lower end. After winding the rope on said drum 15 it is obvious that the teeth of the ratchet-wheel 11 may ride freely over the end of the dog 12, allowing the weight 17 to operate the machine.

Rigidly attached to the shaft 7 is a ratchet-wheel 18, adapted to be engaged by dogs 19, pivotally connected to a gear-wheel 20, loosely mounted on the shaft 7. By means of this dog-and-ratchet mechanism it is obvious that the shaft 7 may be rotated to wind the rope on the drum without imparting motion to the gear-wheel 20. This gear-wheel 20 meshes with a large drive-gear 21, mounted on a counter-shaft 22 and engaging with a pinion 23, secured to a counter-shaft 24, having bearings in the frames 1 and 6 on the opposite side of the machine to that of the large drive-gear 21, and on this shaft 24 is mounted a gear-wheel 25, meshing with a pinion 26 on a shaft 27 below the shaft 24, and on this shaft 27 is a gear-wheel 28, meshing with a pinion 29, and on the shaft of this pinion 29 is a gear-wheel 30, meshing with a pinion 31, secured to the pump-crank shaft 32. On this pump-crank 32 is mounted a band-wheel 33, from which a band may be extended to run light machinery, such, for instance, as a churn or fans.

On the outer ends of the pump-crank shaft 32 is a crank-disk 34, provided with a radial slot within which a wrist-pin 35 may be adjusted with relation to the axis of the crank-disk to regulate the thrust of the pump-rod. From the wrist-pin 35 pitman 36 extends to a pivotal connection with the pump-rod 37, operating in a pump 38. As indicated in Fig. 1 of the drawings, the movements of the pitman 36 may also drive another pump-rod 39 through the medium of a lever 40, connected at one end to said pump-rod 39 and at the other end to the pitman 36 and having a fulcrumed bearing in a bracket 41, extended, as here shown, from the air-cylinder 42 of the pump.

We will now describe means for governing or regulating the speed of the machine. As here shown, this means consists of centrifugal governor-balls 43, secured to pivoted angle-levers 44, which engage at their inner ends with a vertically-movable shaft 45, extended through a hollow shaft 46, to the upper end of which a frame for carrying the governor-balls is secured, and to the lower end of which is secured a bevel-gear 47, meshing with a bevel-gear 48 on the shaft of the pinion 29. To the lower end of the rod 45 is pivotally connected one end of a brake-lever 49, the opposite end of said brake-lever 49 being pivoted to the frame of the machine. Intermediate of its ends this lever 49 is curved upward, and this curved portion is provided with a friction-shoe 50, adapted to engage with the periphery of a friction-wheel 51, mounted on the outer end of the shaft 24.

52 is a lever pivoted to the frame of the machine and bearing at its outer end an adjustable weight 53, which may be held as adjusted by means of a set-screw, as plainly indicated in the drawings. To the opposite end of this lever 52 is pivoted a link 54, the upper end of said link 54 being pivoted to the brake-lever 49 between its shoe portion and its pivotal connection with the rod 45. Obviously the weighted lever 52 will hold the shoe 50 normally out of engagement with the friction-wheel 51, but of course when the machine reaches a certain speed the governor will move the rod 45 downward against the resistance of the weighted lever and consequently cause the shoe 50 to bear with more or less resistance on the friction-wheel, thus regulating or controlling the speed of the machine.

It will be seen that the weighted rope 16 is wound upon the drum 15 by operating the crank, consisting of parts 12 and 13, and then releasing the same. The weights will cause the movement of all the gear-wheels, and consequently operate the pump-rod, and, as above stated, the surplus power of the machine may be employed, if desired, for running light machinery through the medium of the belt connection on the wheel 33.

We have found in practice that this machine runs very steadily and maintains a substantially equal speed through the length of its run.

Having thus described our invention, we claim as new and desire to secure by Letters Patent—

1. A pump-operating machine comprising a motor, a pump-rod-operating crank, a chain of gearing between the motor and said crank and a governor comprising a rotary hollow shaft operated by the gearing, a frame on the upper end of said hollow shaft, weighted angle-levers pivoted to said frame, a shaft connecting with the angle-levers and extended through the hollow shaft, a brake-lever pivoted at one end to the machine-frame and at the other end to the lower end of said shaft, a friction-wheel on a gear-shaft for engagement with the brake-lever, a lever pivoted to the machine-frame, an adjustable weight on one end of said lever and a link connection between the opposite end of said lever and the brake-lever, substantially as specified.

2. A pump-operating mechanism, comprising a driving-shaft, a motor for operating said driving-shaft, a pump-rod-actuating crank, a ratchet-wheel rigidly mounted on the driving-shaft, a gear-wheel loosely mounted on the driving-shaft, a dog on the loose gear-wheel engaging the ratchet-wheel, gearing between said loose gear-wheel and the crank, a governor operating in connection with the gearing between the loose gear and the crank, a gear-wheel on the outer end of the driving-shaft, a pinion meshing with the gear-wheel, a ratchet-wheel mounted on the pinion-shaft, an arm loosely mounted on the pinion-shaft, and a dog-carrying lever having pivotal connection with the outer end of said arm and adapted to engage the ratchet-wheel, the end of said dog-carrying lever opposite the end engaging said ratchet-wheel being extended beyond the end of the arm and provided with a handle, substantially as specified.

GEO. M. CARTER.
JOHN H. DREW.
CHARLES L. DREW.

Witnesses:
CLARENCE L. JOSLYN,
O. W. JOSLYN.